United States Patent
Wang (10) Patent No.: US 11,734,378 B2
(45) Date of Patent: Aug. 22, 2023

(54) METHOD AND APPARATUS OF PRE-RENDERING PAGE, ELECTRONIC DEVICE, AND STORAGE MEDIUM

(71) Applicant: Baidu Online Network Technology (Beijing) Co., Ltd., Beijing (CN)

(72) Inventor: Ning Wang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 134 days.

(21) Appl. No.: 17/419,245

(22) PCT Filed: Nov. 30, 2020

(86) PCT No.: PCT/CN2020/132782
§ 371 (c)(1),
(2) Date: Jun. 28, 2021

(87) PCT Pub. No.: WO2021/174928
PCT Pub. Date: Sep. 10, 2021

(65) Prior Publication Data
US 2022/0308900 A1   Sep. 29, 2022

(30) Foreign Application Priority Data
Mar. 2, 2020   (CN) .......................... 202010136181.6

(51) Int. Cl.
*G06F 16/957* (2019.01)
*G06F 16/958* (2019.01)
(Continued)

(52) U.S. Cl.
CPC .......... *G06F 16/9574* (2019.01); *G06F 9/451* (2018.02); *G06F 16/957* (2019.01);
(Continued)

(58) Field of Classification Search
CPC .......................... G06F 16/9574; G06F 16/986
See application file for complete search history.

(56) References Cited

U.S. PATENT DOCUMENTS

| | | | |
|---|---|---|---|
| 9,720,888 B1 | 8/2017 | Jain et al. | |
| 2002/0188631 A1* | 12/2002 | Tiemann | G06F 16/9574 707/E17.116 |

(Continued)

FOREIGN PATENT DOCUMENTS

| | | |
|---|---|---|
| CN | 107066631 | 8/2017 |
| CN | 110020278 | 7/2019 |

(Continued)

OTHER PUBLICATIONS

Jan Nicklas, HTML Webpack Plugin, GitHub (Nov. 11, 2019), https://github.com/jantimon/html-webpack-plugin/blob/24bf1b5e2a0d087b30d057d1780d8f495aa01e26/README.md.*

(Continued)

*Primary Examiner* — Asher D Kells
(74) *Attorney, Agent, or Firm* — Hamre, Schumann, Mueller & Larson, P.C.

(57) ABSTRACT

The present disclosure provides a method and apparatus of pre-rending a page, an electronic device, and a storage medium. The method of pre-rendering the page may include: acquiring a static resource of a page to be processed; acquiring a hypertext markup language structure information compiled of the page; and generating a static hypertext markup language file of the page by using a native server-side rendering function of a web frame according to the static resource and the hypertext markup language structure information.

5 Claims, 3 Drawing Sheets

(51) Int. Cl.
  *G06F 9/451* (2018.01)
  *G06F 9/445* (2018.01)
  *G06F 9/455* (2018.01)
(52) U.S. Cl.
  CPC ........ *G06F 16/986* (2019.01); *G06F 9/44526* (2013.01); *G06F 9/45529* (2013.01); *G06F 16/958* (2019.01)

(56) References Cited

U.S. PATENT DOCUMENTS

| | | | |
|---|---|---|---|
| 2004/0148565 A1* | 7/2004 | Davis | G06F 16/958 707/E17.116 |
| 2006/0129635 A1 | 6/2006 | Baccou et al. | |
| 2012/0054616 A1 | 3/2012 | Mittal | |
| 2014/0136942 A1 | 5/2014 | Kumar et al. | |
| 2016/0026611 A1 | 1/2016 | Liu et al. | |
| 2017/0346876 A1 | 11/2017 | Lim | |
| 2018/0032491 A1 | 2/2018 | Heo et al. | |
| 2019/0066176 A1 | 2/2019 | Warman et al. | |
| 2019/0238559 A1 | 8/2019 | Paradis et al. | |
| 2019/0303500 A1* | 10/2019 | Mathews | G06F 16/951 |
| 2021/0081464 A1* | 3/2021 | Buehler | H04L 67/02 |

FOREIGN PATENT DOCUMENTS

| | | |
|---|---|---|
| CN | 110096659 | 8/2019 |
| CN | 110187913 | 8/2019 |
| CN | 110309451 | 10/2019 |
| CN | 110795195 | 2/2020 |
| CN | 110851683 | 2/2020 |
| CN | 111506387 | 8/2020 |
| JP | 2016502718 A | 1/2016 |
| JP | 2017532621 A | 11/2017 |
| WO | 2018/022359 | 2/2018 |

OTHER PUBLICATIONS

Mark Dalgleish, Static Site Generator Webpack Plugin, GitHub (Mar. 17, 2017), https://github.com/markdalgleish/static-site-generator-webpack-plugin/blob/69d2b22865da8f537ab881ba4a9b64f06c2ddebe/README.md.*

Evan Salter, Webpack Static Site Generator, GitHub (Apr. 29, 2017), https://github.com/evansalter/webpack-static-site-generator/blob/75a36dbf8cdeb5d867ff252c6e6ba9b6ca4050ca/README.md.*

Extended European Search Report issued in the corresponding European patent application No. 20904237.3, dated Mar. 9, 2022, 9 pages.

International Search Report and Written Opinion, issued in the corresponding PCT Application No. PCT/CN2020/132782, dated Mar. 8, 2021, 9 pages.

Office action issued in JP 2021-536286, dated Aug. 30, 2022, with English translation (14 pages).

Chinese Office Action, issued in corresponding Chinese Application No. 202010136181.6, dated Jan. 20, 2023, 6 pages.

Qiu et al., "Research and realization of Web development based on Node.js middle layer: Taking book sharing platform as an example", Hebei Journal of Industrial Science and Technology, vol. 34, No. 2, Mar. 2017, 7 pages.

Liu et al., "SWAROVsky: Optimizing Resource Loading for Mobile Web Browsing", IEEE Transactions on Mobile Computing, vol. 16, No. 10, Oct. 2017, 14 pages.

* cited by examiner

METHOD AND APPARATUS OF PRE-RENDERING PAGE, ELECTRONIC DEVICE, AND STORAGE MEDIUM

CROSS REFERENCE TO RELATED APPLICATION(S)

This application corresponds to PCT Application PCT/CN2020/132782, which claims priority to Chinese patent Application No. CN2020101361816 entitled "METHOD AND APPARATUS OF PRE-RENDERING PAGE, ELECTRONIC DEVICE, AND STORAGE MEDIUM," filed on Mar. 2, 2020, the content of which are incorporated herein by reference in their entirety.

TECHNICAL FIELD

The present disclosure relates to computer application technology, and in particular to a method and apparatus of pre-rendering a page, an electronic device and a storage medium in a field of Internet.

BACKGROUND

Emergence of AJAX technology enables Single Page Application (SPA), so that web applications may display contents of different pages without refreshing. AJAX refers to Asynchronous JavaScript And XML.

In a single page application, there is usually only one HTML (Hypertext Markup Language) file, which matches a corresponding routing script according to an accessed URL (Uniform Resource Locator) so as to render page content dynamically. While the single page application optimizes user experience, it also brings some problems, such as unfriendly SEO (Search Engine Optimization), long visibility time for first screen, and so on. Pre-render technology is proposed to solve these problems.

Pre-render refers to generating a static HTML file matching a pre-rendered route during page compilation and building. Common pre-render methods include a headless-browser-based pre-render method. However, this method needs to go through a complete browser process for each page routing, consumes resources of a page builder, and often needs to install some additional system libraries to support operations of the headless browser. In addition, it is needed to add pipeline flows, and an output process is slow.

SUMMARY

In view of this, the present disclosure provides a method and apparatus of pre-rendering a page, an electronic device, and a storage medium.

There is provided a method of pre-rendering a page, including: acquiring a static resource of a page to be processed; acquiring a hypertext markup language structure information compiled of the page; and generating a static hypertext markup language file of the page by using a native server-side rendering function of a web frame according to the static resource and the hypertext markup language structure information.

According to some optional embodiments of the present disclosure, the acquiring a static resource of a page to be processed includes: acquiring the static resource by listening to a first predetermined hook of an html-webpack-plugin; and the acquiring a hypertext markup language structure information compiled of the page includes: acquiring the hypertext markup language structure information by listening to a second predetermined hook of the html-webpack-plugin.

According to some optional embodiments of the present disclosure, the first predetermined hook contains a before-AssetTagGeneration hook; and the second predetermined hook contains an afterTemplateExecution hook.

According to some optional embodiments of the present disclosure, the static resource contains Cascading Style Sheets and JavaScript scripts.

According to some optional embodiments of the present disclosure, the generating a static hypertext markup language file of the page by using a native server-side rendering function of a web frame includes: executing the JavaScript scripts in an eval environment, simulating a required browser host environment by a JavaScript Document Object Model JSDOM, and generating the static hypertext markup language file of the page by using the native server-side rendering function of the web frame.

There is provided an apparatus of pre-rendering a page, including: an acquisition unit configured to acquire a static resource of a page to be processed, and acquire a hypertext markup language structure information compiled of the page; and a generation unit configured to generate a static hypertext markup language file of the page by using a native server-side rendering function of a web frame according to the static resource and the hypertext markup language structure information.

According to some optional embodiments of the present disclosure, the acquisition unit is further configured to: acquire the static resource by listening to a first predetermined hook of an html-webpack-plugin; and acquire the hypertext markup language structure information by listening to a second predetermined hook of the html-webpack-plugin.

According to some optional embodiments of the present disclosure, the first predetermined hook contains a before-AssetTagGeneration hook; and the second predetermined hook contains an afterTemplateExecution hook.

According to some optional embodiments of the present disclosure, the static resource contains Cascading Style Sheets and JavaScript scripts.

According to some optional embodiments of the present disclosure, the generation unit is further configured to execute the JavaScript scripts in an eval environment, simulate a required browser host environment by a JavaScript Document Object Model JSDOM, and generate the static hypertext markup language file of the page by using the native server-side rendering function of the web frame.

There is provided an electronic device, including: at least one processor; and a memory communicatively connected to the at least one processor, wherein the memory stores instructions executable by the at least one processor, and the instructions, when executed by the at least one processor, cause the at least one processor to implement the method described above.

There is provided a non-transitory computer-readable storage medium having computer instructions stored thereon, and the computer instructions allow a computer to implement the method described above.

BRIEF DESCRIPTION OF THE DRAWINGS

The drawings are used to better understand the solution and do not constitute a limitation to the present disclosure.

DETAILED DESCRIPTION OF EMBODIMENTS

The exemplary embodiments of the present disclosure are described below with reference to the drawings, which include various details of the embodiments of the present disclosure to facilitate understanding, and which should be considered as merely illustrative. Therefore, those ordinary skilled in the art should realize that various changes and modifications may be made to the embodiments described herein without departing from the scope and spirit of the present disclosure. In addition, for clarity and conciseness, descriptions of well-known functions and structures are omitted in the following description.

In addition, it should be understood that the term "and/or" herein only describes an association relationship of associated objects, which means that there may be three relationships. For example, A and/or B may refer to only A, only B, as well as A and B. In addition, a symbol "/" herein generally indicates an "or" relationship of associated objects.

Figure 1:
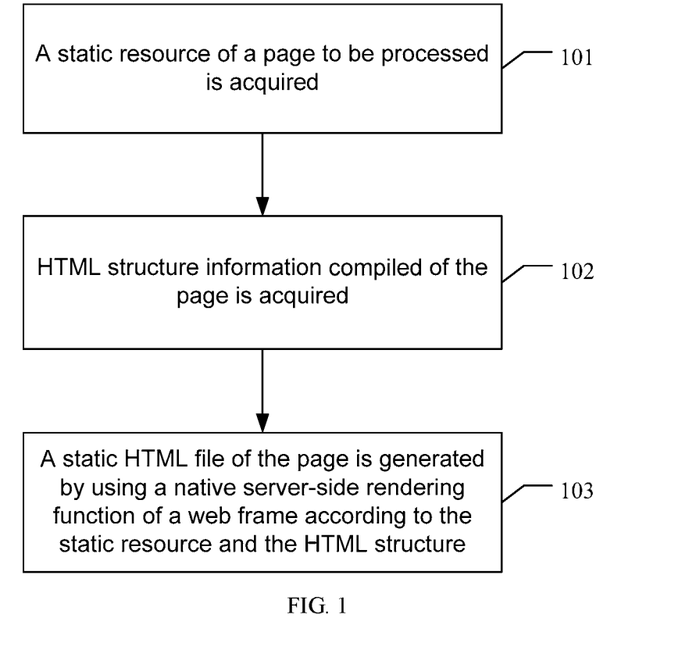
FIG. 1 shows a flowchart of a method of pre-rendering a page according to the embodiments of the present disclosure.

FIG. 1 shows a flowchart of a method of pre-rendering a page according to the embodiments of the present disclosure. As shown in FIG. 1, the method includes following steps.

In step 101, a static resource of a page to be processed is acquired.

In step 102, HTML structure information compiled of the page is acquired.

In step 103, a static HTML file of the page is generated by using a native server-side rendering function of a web frame according to the static resource and the HTML structure information.

A developer may push a developed page to an environment of compilation and building. After compilation and building, the page may be deployed online, such as on a server in a computer room. When a user accesses the page through a browser, an access request is submitted to the corresponding server. The server may return the corresponding HTML file according to the page requested. The browser parses the HTML file and displays the page to the user.

The HTML file usually contains four parts of content, including general page content, Cascading Style Sheets (CSS), JavaScript scripts, and dynamic data (also called personalized data).

In a practical application, the user sees a gradual enhancement process of the page, rather than seeing a final page directly. For example, for the HTML file returned, the page in an initial state is a blank page. That is, the user may see nothing but a blank page obtained after an initial rendering. After the JavaScript scripts are executed, the general page content may be operated, so that the blank page changes to have content and the content may have a corresponding style according to CSS. This state may be referred to as an intermediate state. In addition, the JavaScript scripts may request dynamic data from the server, and the page content may be updated according to the dynamic data requested, so that the page reaches a final state.

The pre-render may be performed during the compilation and building of the page. The process from the initial state to the intermediate state is executed first in the pre-render environment. After the execution, the page generated is in the intermediate state. That is, the page changes from the initial state to the intermediate state in advance. In this way, when visiting the page, the user may see the page changing directly from the intermediate state to the final state, without seeing the initial blank page.

In the embodiments, for the page to be processed, the static resource of the page may be first acquired. The static resource may contain Cascading Style Sheets and JavaScript scripts. Optionally, the static resource may be acquired by listening to a first predetermined hook of an html-webpack-plugin, such as a beforeAssetTagGeneration hook.

In addition, for the page to be processed, the HTML structure information of the page may also be acquired. The HTML structure information may contain the general page content, etc. Optionally, the HTML structure information may be acquired by listening to a second predetermined hook of the html-webpack-plugin, such as an afterTemplateExecution hook.

The beforeAssetTagGeneration hook and the afterTemplateExecution hook are both hooks of existing html-webpack-plugin. In addition to being schedulable by a parasitic webpack plugin system, the html-webpack-plugin also provides hooks for calling.

In a practical application, an execution subject of the method described in the present embodiments may be a webpack pre-render plugin. The pre-render plugin may call/listen to the hooks of the html-webpack-plugin. For example, the pre-render plugin may acquire the static resource of the page by listening to the beforeAssetTagGeneration hook of the html-webpack-plugin, and the beforeAssetTagGeneration hook may acquire the static resource of the page from a compilation context generated according to existing methods. In addition, the pre-render plugin may acquire the HTML structure information generated by compilation by listening to the afterTemplateExecution hook of the html-webpack-plugin.

After acquiring the static resource and the HTML structure information of the page, the static HTML file of the page may be generated by using the native server-side rendering function of the web frame. Optionally, the JavaScript scripts may be executed in an eval environment. That is, a JavaScript module exported by the page may be executed by using eval. The browser host environment required is simulated by a JavaScript Document Object Model (JSDOM). Then, the static HTML file of the page is generated by using the native server-side rendering function of the web frame and the static HTML file may be written to a disk.

Eval is a library that may execute JavaScript codes in a non-graphic-interface environment, simulate an execution process of the browser, drive the page to change from the initial state to the intermediate state. The browser host environment required may be simulated by a JSDOM, and then the static HTML file of the page may be generated by using the native server-side rendering function of the web frame.

Since the native server-side rendering function of the web frame is used, a whole family bucket of the frame, such as Redux, React Router, etc. of React, and Vuex, Vue Router, etc. of Vue.js, is available.

Figure 2:
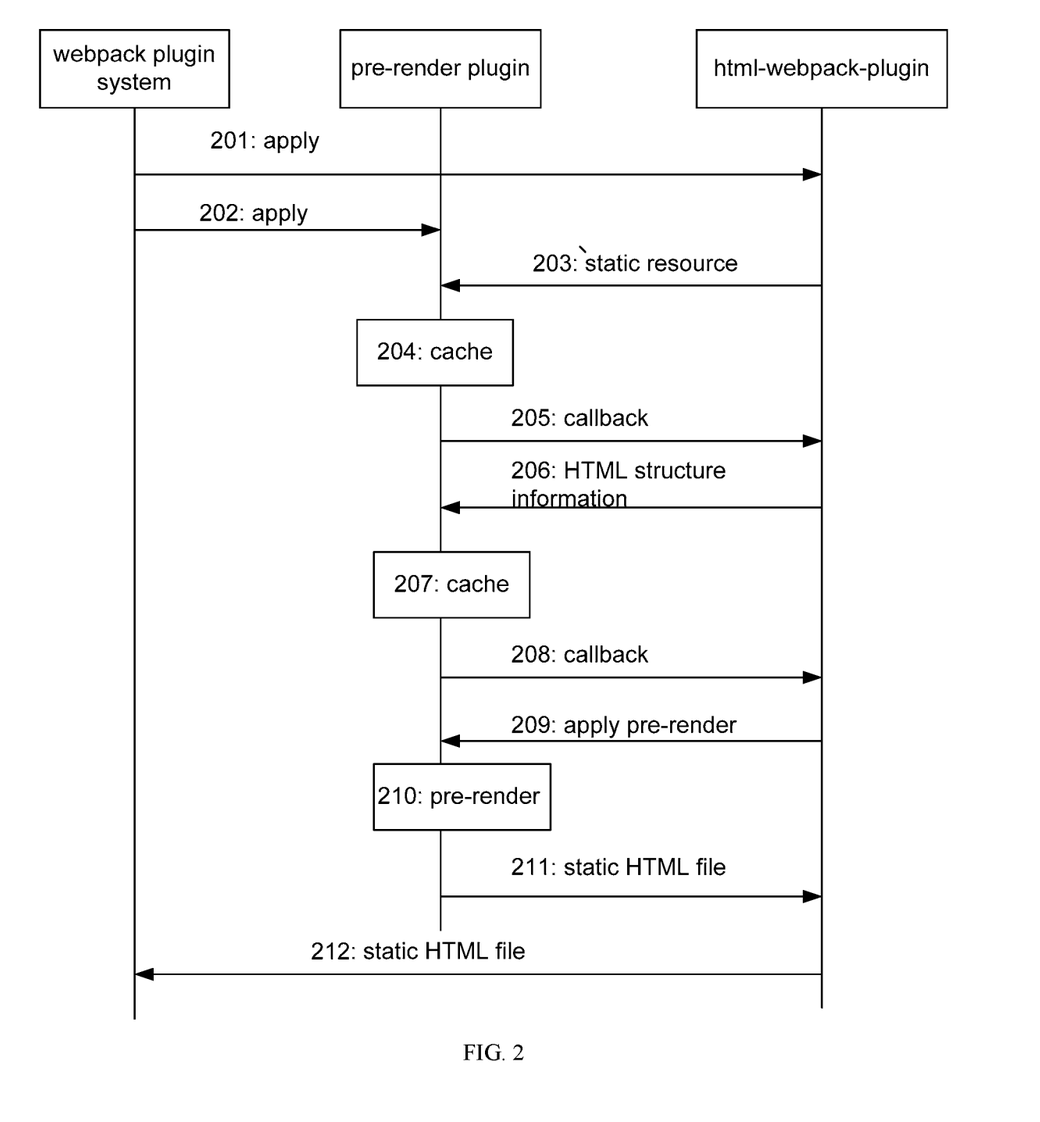
FIG. 2 shows a schematic diagram of an overall implementation process of a method of pre-rendering a page according to the embodiments of the present disclosure.

Based on the description above, FIG. 2 shows a schematic diagram of an overall implementation process of the method of pre-rendering the page according to the present disclosure. As shown in FIG. 2, the method includes following steps.

In step 201 to step 202, the webpack plugin system applies the pre-render plugin and the html-webpack-plugin respectively.

In step 203, the pre-render plugin acquires the static resource of the page by listening to the beforeAssetTagGeneration hook of the html-webpack-plugin.

The static resource may contain CSS and JavaScript scripts.

In step 204, the pre-render plugin caches the static resource acquired.

In step 205, the pre-render plugin returns callback information to the html-webpack-plugin.

In step 206, the pre-render plugin acquires the HTML structure information compiled of the page by listening to the afterTemplateExecution hook of the html-webpack-plugin.

The HTML structure information may contain general page content, etc.

In step 207, the pre-render plugin caches the HTML structure information acquired.

In step 208, the pre-render plugin returns callback information to the html-webpack-plugin.

In step 209 to step 210, the pre-render plugin listens to the beforeEmit hook of the html-webpack-plugin, and performs following operations according to the static resource and the HTML structure information of the page. The JavaScript scripts are executed in the eval environment, the browser host environment required is simulated by the JSDOM, and the static HTML file of the page is generated by using the native server-side rendering function of the web frame.

As a possible implementation, the pre-render plugin may finally generate the static HTML file of the page when it listens to the beforeEmit hook of the html-webpack-plugin.

In step 211, the pre-render plugin returns the static HTML file acquired to the html-webpack-plugin.

In step 212, the html-webpack-plugin returns the static HTML file acquired to the webpack plugin system.

The webpack plugin system may display the static HTML file through a console in the existing way, and the console may display the output file in real time.

It should be noted that for the sake of description, the method embodiments described above are all expressed as a series of actions, but those skilled in the art should know that the present disclosure is not limited by the described sequence of actions. According to the present disclosure, some steps may be performed in other order or simultaneously. Those skilled in the art should also know that the embodiments described in the specification are all optional embodiments, and the involved actions and modules are not necessarily required by the present disclosure.

In the embodiments described above, the description of each embodiment has respective emphasis. For parts that are not described in detail in some embodiments, reference may be made to related descriptions of other embodiments.

In summary, by adopting the solution described in the method embodiments of the present disclosure, for the page to be processed, the static resource of the page and the HTML structure information compiled of the page may be acquired. Then the static HTML file of the page may be generated by using the native server-side rendering function of the web frame, that is, the pre-render is achieved. In this way, the problem in the related art caused by the headless-browser-based pre-render method is avoided, the pre-render efficiency is improved, and the resource consumption is saved. The static resource and the HTML structure information may be acquired respectively by different hooks of the html-webpack-plugin, which is convenient and easy to implement. Furthermore, the JavaScript scripts may be executed in the eval environment, the browser host environment required may be simulated by the JSDOM, and the static HTML file of the page may be generated by using the native server-side rendering function of the web frame. Therefore, the pre-rending performance and stability may be improved.

The above is the description of the method embodiments. The solution of the present application is further described below by apparatus embodiments.

Figure 3:
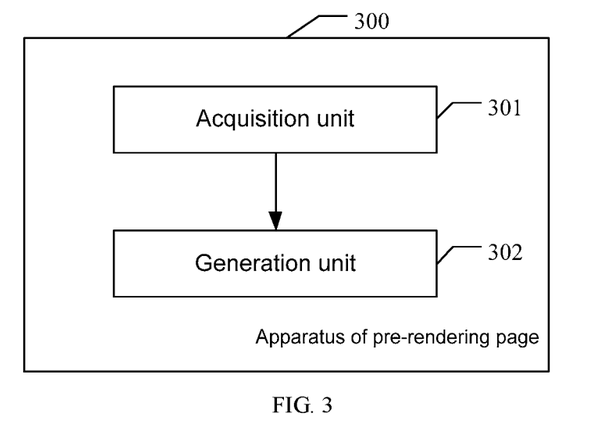
FIG. 3 shows a schematic diagram of a composition structure of an apparatus 300 of pre-rendering a page according to the embodiments of the present disclosure.

FIG. 3 shows a schematic diagram of a composition structure of an apparatus 300 of pre-rending a page according to the present disclosure. As shown in FIG. 3, the apparatus 300 includes an acquisition unit 301 and a generation unit 302.

The acquisition unit 301 is used to acquire a static resource of a page to be processed, and acquire a hypertext markup language structure information compiled of the page.

The generation unit 302 is used to generate a static HTML file of the page by using a native server-side rendering function of a web frame according to the static resource and the HTML structure information.

For the page to be processed, the acquisition unit 301 may first acquire the static resource of the page. The static resource may contain Cascading Style Sheets and JavaScript scripts. Optionally, the static resource may be acquired by listening to a first predetermined hook of an html-webpack-plugin, such as a beforeAssetTagGeneration hook.

In addition, for the page to be processed, the acquisition unit 301 may further acquire the HTML structure information of the page after compilation, which may contain the general page content, etc. Optionally, the HTML structure information may be acquired by listening to a second predetermined hook of the html-webpack-plugin, such as an afterTemplateExecution hook.

After acquiring the static resource and the HTML structure information of the page, the generation unit 302 may further generate the static HTML file of the page by using the native server-side rendering function of the web frame. Optionally, the generation unit 302 may execute the JavaScript scripts in an eval environment (that is, execute a JavaScript module exported by the page by using eval), simulate the required browser host environment by the JSDOM, and generate the static HTML file of the page by using the native server-side rendering function of the web frame. The static HTML file of the page may be further written to a disk.

Eval is a library that may execute JavaScript codes in a non-graphic-interface environment, simulate an execution process of the browser, drive the page to change from the initial state to the intermediate state. The browser host environment required may be simulated by the JSDOM, and then the static HTML file of the page may be generated by using the native server-side rendering function of the web frame.

For the specific work flow of the apparatus embodiments shown in FIG. 3, reference may be made to the relevant description in the method embodiments described above, which will not be repeated here.

In summary, by adopting the solution described in the apparatus embodiments of the present disclosure, for the page to be processed, the static resource of the page and the HTML structure information compiled of the page may be acquired Then the static HTML file of the page may be generated by using the native server-side rendering function of the web frame, that is, the pre-render is achieved. In this way, the problem in the related art caused by the headless-browser-based pre-render method is avoided, the pre-render efficiency is improved, and the resource consumption is saved. The static resource and the HTML structure information may be acquired respectively by different hooks of the html-webpack-plugin, which is convenient and easy to implement. Furthermore, the JavaScript scripts may be executed in the eval environment, the browser host environment required may be simulated by the JSDOM, and the static HTML file of the page may be generated by using the native server-side rendering function of the web frame. Therefore, the pre-rendering performance and stability may be improved.

According to the embodiments of the present disclosure, the present disclosure further provides an electronic device and a readable storage medium.

Figure 4:
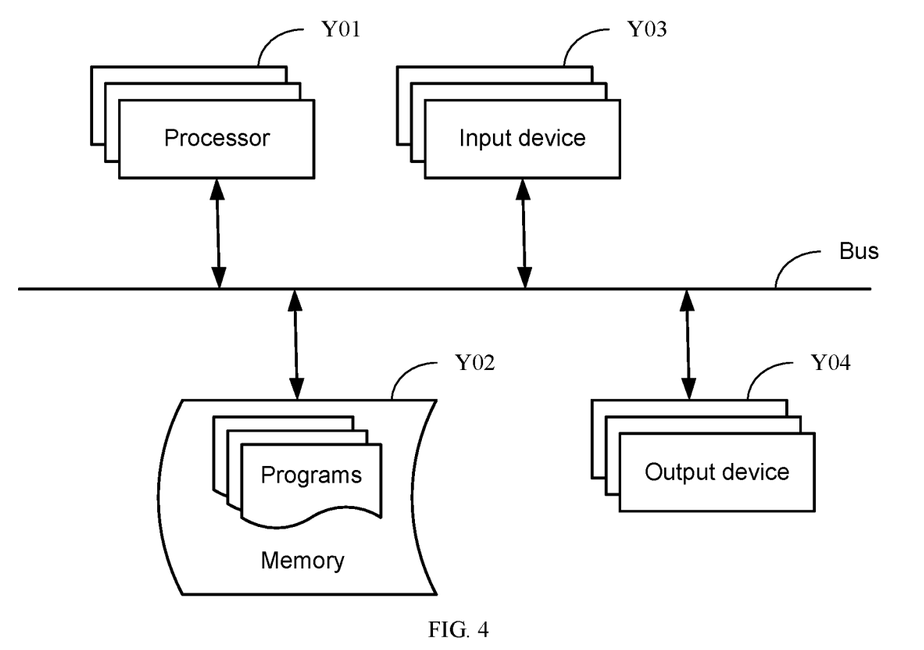
FIG. 4 shows a block diagram of an electronic device for implementing a method of pre-rendering a page according to the embodiments of the present disclosure.

FIG. 4 shows a block diagram of an electronic device according to the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 4, the electronic device may include one or more processors Y01, a memory Y02, and interface(s) for connecting various components, including high-speed interface(s) and low-speed interface(s). The various components are connected to each other by using different buses, and may be installed on a common motherboard or installed in other manners as required. The processor may process instructions executed in the electronic device, including instructions stored in or on the memory to display graphical information of GUI (Graphical User Interface) on an external input/output device (such as a display device coupled to an interface). In other embodiments, a plurality of processors and/or a plurality of buses may be used with a plurality of memories, if necessary. Similarly, a plurality of electronic devices may be connected in such a manner that each device provides a part of necessary operations (for example, as a server array, a group of blade servers, or a multi-processor system). In FIG. 4, a processor Y01 is illustrated by way of example.

The memory Y02 is a non-transitory computer-readable storage medium provided by the present disclosure. The memory stores instructions executable by at least one processor, to cause the at least one processor to perform the method of pre-rendering the page provided in the present disclosure. The non-transitory computer-readable storage medium of the present disclosure stores computer instructions for allowing a computer to execute the method of pre-rendering the page provided in the present disclosure.

The memory Y02, as a non-transitory computer-readable storage medium, may be used to store non-transitory software programs, non-transitory computer-executable programs and modules, such as program instructions/modules corresponding to the method of pre-rendering the page in the embodiments of the present disclosure. The processor Y01 executes various functional applications and data processing of the server by executing the non-transient software programs, instructions and modules stored in the memory Y02, thereby implementing the method of pre-rendering the page in the embodiments of the method mentioned above.

The memory Y02 may include a program storage area and a data storage area. The program storage area may store an operating system and an application program required by at least one function. The data storage area may store data etc. generated by using the electronic device according to the method of pre-rendering the page. In addition, the memory Y02 may include a high-speed random access memory, and may further include a non-transitory memory, such as at least one magnetic disk storage device, a flash memory device, or other non-transitory solid-state storage devices. In some embodiments, the memory Y02 may optionally include a memory provided remotely with respect to the processor Y01, and such remote memory may be connected through a network to the electronic device. Examples of the above-mentioned network include, but are not limited to the Internet, intranet, blockchain network, local area network, mobile communication network, and combination thereof.

The electronic device may further include an input device Y03 and an output device Y04. The processor Y01, the memory Y02, the input device Y03 and the output device Y04 may be connected by a bus or in other manners. In FIG. 4, the connection by a bus is illustrated by way of example.

The input device Y03 may receive input information of numbers or character, and generate key input signals related to user settings and function control of the electronic device, such as a touch screen, a keypad, a mouse, a track pad, a touchpad, a pointing stick, one or more mouse buttons, a trackball, a joystick, and so on. The output device Y04 may include a display device, an auxiliary lighting device, a tactile feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in a digital electronic circuit system, an integrated circuit system, an application specific integrated circuit (ASIC), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

These computing programs (also referred to as programs, software, software applications, or codes) contain machine instructions for a programmable processor, and may be implemented using high-level programming languages, object-oriented programming languages, and/or assembly/machine languages. As used herein, the terms "machine-readable medium" and "computer-readable medium" refer to any computer program product, apparatus and/or device (for example, magnetic disk, optical disk, memory, programmable logic device) for providing machine instructions and/or data to a programmable processor, including a machine-readable medium for receiving machine instructions as machine-readable signals. The term "machine-readable signal" refers to any signal for providing machine instructions and/or data to a programmable processor.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the systems and technologies described herein), or a computing system including any combination of such back-end components, middleware components or front-end components. The components of the system may be connected to each other by digital data communication (for example, a communication network) in any form or through any medium. Examples of the communication network include a local area network, a wide area network, a blockchain network, and Internet.

The computer system may include a client and a server. The client and the server are generally far away from each other and usually interact through a communication network. The relationship between the client and the server is generated through computer programs running on the corresponding computers and having a client-server relationship with each other.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of pre-rendering a page, comprising:
acquiring a static resource of a page to be processed;
acquiring a hypertext markup language structure information compiled of the page; and
generating a static hypertext markup language file of the page by using a native server-side rendering function of a web frame according to the static resource and the hypertext markup language structure information,
wherein the static resource contains Cascading Style Sheets and JavaScript scripts, and wherein the generating a static hypertext markup language file of the page by using a native server-side rendering function of a web frame comprises: executing the JavaScript scripts in an eval environment, simulating a required browser host environment by a JavaScript Document Object Model JSDOM, and generating the static hypertext markup language file of the page by using the native server-side rendering function of the web frame.

2. The method of claim 1, wherein the acquiring a static resource of a page to be processed comprises acquiring the static resource by listening to a first predetermined hook of an html-webpack-plugin; and
wherein the acquiring a hypertext markup language structure information compiled of the page comprises acquiring the hypertext markup language structure information by listening to a second predetermined hook of the html-webpack-plugin.

3. The method of claim 2, wherein the first predetermined hook contains a beforeAssetTagGeneration hook, and the second predetermined hook contains an afterTemplateExecution hook.

4. An electronic device, comprising:
at least one processor; and
a memory communicatively connected to the at least one processor, wherein the memory stores instructions executable by the at least one processor, and the instructions, when executed by the at least one processor, cause the at least one processor to implement operations of pre-rendering a page, comprising:
acquiring a static resource of a page to be processed;
acquiring a hypertext markup language structure information compiled of the page; and
generating a static hypertext markup language file of the page by using a native server-side rendering function of a web frame according to the static resource and the hypertext markup language structure information,
wherein the static resource contains Cascading Style Sheets and JavaScript scripts, and wherein the generating a static hypertext markup language file of the page by using a native server-side rendering function of a web frame comprises: executing the JavaScript scripts in an eval environment, simulating a required browser host environment by a JavaScript Document Object Model JSDOM, and generating the static hypertext markup language file of the page by using the native server-side rendering function of the web frame.

5. A non-transitory computer-readable storage medium having computer instructions stored thereon, wherein the computer instructions allows a computer to implement operations of pre-rendering a page, comprising:
acquiring a static resource of a page to be processed;
acquiring a hypertext markup language structure information compiled of the page; and
generating a static hypertext markup language file of the page by using a native server-side rendering function of a web frame according to the static resource and the hypertext markup language structure information,
wherein the static resource contains Cascading Style Sheets and JavaScript scripts, and wherein the generating a static hypertext markup language file of the page by using a native server-side rendering function of a web frame comprises: executing the JavaScript scripts in an eval environment, simulating a required browser host environment by a JavaScript Document Object Model JSDOM, and generating the static hypertext markup language file of the page by using the native server-side rendering function of the web frame.

\* \* \* \* \*